United States Patent [19]
Wang et al.

[11] Patent Number: 5,914,892
[45] Date of Patent: Jun. 22, 1999

[54] STRUCTURE AND METHOD OF ARRAY MULTIPLICATION

[75] Inventors: Shyh-Jye Wang, Hsinchu; Hsing-Chien Huang, Tapei Hsien; Chi-Chiang Wu, Hsinchu, all of Taiwan

[73] Assignee: Taiwan Semiconductor Manufacturing Co., Ltd, Hsinchu, Taiwan

[21] Appl. No.: 08/964,040

[22] Filed: Nov. 4, 1997

[51] Int. Cl.[6] .................................................. G06F 7/52
[52] U.S. Cl. ............................................................ 364/758
[58] Field of Search ................................... 364/757–759, 364/754.01

[56] References Cited

U.S. PATENT DOCUMENTS

| | | | |
|---|---|---|---|
| 4,369,500 | 1/1983 | Fette | 364/758 |
| 4,736,335 | 4/1988 | Barkan | 364/758 |
| 4,982,355 | 1/1991 | Nishimura et al. | 364/758 |
| 5,404,323 | 4/1995 | Xu et al. | 364/7.57 |

*Primary Examiner*—Tan V. Mai
*Attorney, Agent, or Firm*—Kinney & Lange, P.A.

[57] ABSTRACT

A structure and method for forming multiplication of a b-bit multiplicand X and a b-bit multiplier Y to generate a product P is disclosed. The present invention includes cells $C_{mn}$ configured in a b×b array, and pieces of means for generating partial product $X_{mn}$, wherein outputs of the partial product generating means are connected to first inputs of the cells respectively. The second inputs of the cells $C_{mn}$, where m=0, 1, 2, . . . , b−2, and n=1, 2, . . . , b−1, are connected to first outputs of the cells $C_{m+1,\,n-1}$ respectively, and the second inputs of the cells $C_{b-1,\,n}$, where n=1, 2, . . . , b−1, are connected to second outputs of the cells $C_{n-1,\,b-1}$ respectively. Further, the third inputs of the cells $C_{mn}$, where m=0, 1, 2, . . . , b−1, and n=2, 3, . . . , b−1, are connected to the second outputs of the cells $C_{m,\,n-1}$. Therefore, a portion of the product $P_f$, where f=0, 1, . . . , b−1, comes from the first outputs of the cells $C_{0,\,f}$, another portion of the product $P_g$, where g=b, b+1, . . . , 2b−1, comes from the first outputs of the cells $C_{g-3,\,b-1}$, and a most significant bit $P_{2b-1}$ of the product comes from the second output of the cell $C_{b-1,b-1}$.

9 Claims, 4 Drawing Sheets

STRUCTURE AND METHOD OF ARRAY MULTIPLICATION

BACKGROUND OF THE INVENTION

1. Field of the Invention

The present invention relates to an array multiplier, and particularly, to a structure and method of array multiplication.

2. Description of the Prior Art

Multiplication is one of basic arithematics commonly used in computer systems. Because of its complex computation involved, a great deal of time is thus required to calculate the final product of one number multiplied by another. The above is true especially for performing multiplication of two numbers having large amount of bits, which is commonly done in a software manner.

An array multiplier has been disclosed based on the observation that partial products calculated during the multiplication process can be independently computed in parallel. For example, let $X=X_3X_2X_1X_0$ and $Y=Y_3Y_2Y_1Y_0$ be 4-bit binary integers representing multiplicand and multiplier, respectively, and $P=P_7P_6 \ldots P_1P_0$ be 8-bit product, which are shown below along with their partial products.

|    |          |          |          |          | $X_3$    | $X_2$    | $X_1$    | $X_0$    | Multiplicand |
|----|----------|----------|----------|----------|----------|----------|----------|----------|--------------|
|    |          |          |          |          | $Y_3$    | $Y_2$    | $Y_1$    | $Y_0$    | Multiplier |
|    |          |          |          |          | $X_3Y_0$ | $X_2Y_0$ | $X_1Y_0$ | $X_0Y_0$ | Partial Product |
|    |          |          |          | $X_3Y_1$ | $X_2Y_1$ | $X_1Y_1$ | $X_0Y_1$ |          | Partial product |
|    |          |          | $X_3Y_2$ | $X_2Y_2$ | $X_1Y_2$ | $X_0Y_2$ |          |          | Partial Product |
| +) |          | $X_3Y_3$ | $X_2Y_3$ | $X_1Y_3$ | $X_0Y_3$ |          |          |          | Partial Product |
|    | $P_7$    | $P_6$    | $P_5$    | $P_4$    | $P_3$    | $P_2$    | $P_1$    | $P_0$    | Product |

Each bit of the multiplier Y is timed to the multiplicand X to produce a corresponding partial product, followed by adding all these partial products in the manner shown above to obtain the final product P. The arrangement mentioned above is well suited to hardware implementation. FIG. 1 shows a structure 10 illustrating the arrangement of the partial products constructed by a 4×4 array of standard AND gates 12.

In order to complete the process of the multiplication, an array of adders is further required to add the partial products together. FIG. 2A shows a structure illustrating a 4×4 array multiplier 20 consisted of a 4×4 partial product array 201 and an array of adders 203. Inside the array of adders 203, HA 2030 denotes a standard half adder that has two input operands and two outputs (i.e., sum and carry), and FA 2032 denotes a standard full adder that has three input operands and two outputs. Furthermore, WTA 2034 or 2036 denotes a Wallace Tree adder that can perform addition with multiple (generally more than three) input operands. For example, the WTA 2034 that generates $P_3$ has five input operands, and the WTA 2036 that generates $P_4$ or $P_2$ has four input operands. As the WTA 2034 or 2036 is not a standard component, it is generally constructed by two layers of standard logic components. FIG. 2B shows one implementation of the WTA 2034. A full adder FA which takes three inputs and a half adder HA1 which takes two inputs are used as the first layer. Therefore, the outputs from the full adder FA and the half adder HA1, respectively, are fed to another half adder HA2, which generates a sum bit and a carry bit. For the WTA 2036 which generates $P_2$ or $P_4$, for example, two layers of half adders HA1, HA2, and HA3 are arranged as shown in FIG. 2C. One of the main drawbacks of the array multiplier with Wallace Tree adder is its irregularity in the layout, which wastes a substantial portion of area, and increases difficulties in laying out the circuit.

In order to eliminate the drawback mentioned above, another multiplier 30 has been disclosed as shown FIG. 3, wherein carry-saved adders are used. Beginning from the second row of the partial products 302, half adders HAs or full adders FAs are used to calculate the sums of the partial products of the current row and its precedent row. For each array cell, one of the operands inputting to the half adder HA or the full adder FA is the resultant output of a corresponding AND gate in the same cell. Another one or ones of the operands inputting to the half adder HA or the full adder FA are connected as the arrows point. It is noted that carriers do not propagate in the same row but to the next row. Consequently, an additional row of adders 304 is required to add the sums and carriers from the last row of the partial products 302. In the 4×4 carry-saved array multiplier 30 in FIG. 3, eight full adders FAs, four half adders HAs, and sixteen standard AND gates are required.

Although each adder in the additional row 304 has more uniform input bits than that in the Wallace Tree adders 203 (FIG. 2A), the array cells become irregular in their layout due to the introduction of the half adders HAs and the full adders FAs. Moreover, except for the first row of the partial products 302 which does not include adders, other rows of the partial products 302 still suffer from irregularity in layout since some cells contain adders and some do not.

SUMMARY OF THE INVENTION

In accordance with the present invention, a structure and method is provided for performing multiplication that substantially increases regularity of its layout structure. In one embodiment, a multiplication of a multiplicand X and a multiplier Y is performed to generate a product P, wherein the multiplicand X is a b-bit number ($X=X_{b-1}X_{b-2} \ldots X_1X_0$), the multiplier Y is a b-bit number ($Y=Y_{b-1}Y_{b-2} \ldots Y_1Y_0$), and the product P is a 2b-bit number ($P=P_{2b-1}P_{2b-2} \ldots P_1P_0$). In the disclosed array multiplier, cells $C_{mn}$ are configured in a b×b array, where n=0, 1, 2, . . . , b−1, and n=0, 1, 2, . . . , b−1, and AND gates are used to generate partial product $X_{mn}$, each piece of the AND gates being correspondingly associated with one of the cells $C_{mn}$ so that outputs of the AND gates are connected to first inputs of the cells respectively. Half adders are associated with the cells $C_{m1}$ respectively, where m=0, 1, . . . , b−1, and full adders are associated with the cells $C_{mn}$ respectively, where m=0, 1, . . . , b−1, and n=1, 2, . . . , b−2. Further, second inputs of the cells $C_{mn}$, where m=0, 1, 2, . . . , b−2, and n=1, 2, . . . , b−1, are connected to sum outputs of the cells $C_{m+1,\ n-1}$, respectively, and second inputs of the cells $C_{b-1,\ n}$, where n=1, 2, . . . , b−1, are connected to carry outputs of the cells $C_{n-1,\ b-1}$ respectively. Also, third inputs of the cells $C_{mn}$, where m=0, 1, 2, . . . , b−1, and n=2, 3, . . . , b−1, are connected to the carry outputs of the cells $C_{m,\ n-1}$. Therefore, a portion of the product $P_f$, where f=0, 1, . . . , b−1, comes from the sum outputs of the cells $C_{0,\ f}$, another portion of the product $P_g$, where g=b, b+1, . . . , 2b−2, comes from the sum outputs of the cells $C_{g-3,\ b-1}$, and the most significant bit $P_{2b-1}$ of the product comes from the carry output of the cell $C_{b-1,b-1}$.

In accordance with one embodiment of the present invention, the method for performing multiplication of a multiplicand X and a multiplier Y to generate a product P includes generating partial products $X_{mn}$, where m=0, 1, 2, ..., b−1, and n=0, 1, 2, ..., b−1, followed by firstly adding the partial products $X_{m+1, n-1}$ to the partial products $X_{mn}$, where m=0, 1, 2, ..., b−2, and n=1, 2, ..., b−1, wherein the first addition respectively generates a carry output for each of the partial products. Next, carry outputs of the partial products $X_{n-1, b-1}$ are secondly added to the partial products $X_{b-1, n}$, where n=1, 2, ..., b−1, wherein the second addition respectively generates the carry output for the partial products. Finally, the carry outputs of the partial products $X_{m, n+1}$ are thirdly added to the partial products $X_{mn}$, where m=0, 1, 2, ..., b−1, and n=2, 3, ..., b−1. Therefore, a right portion of the product $P_f$, where f=0, 1, ..., b−1, comes from the sum outputs of the partial products $X_{0, f}$, and a portion of the product $P_g$, where g=b, b+1, ..., 2b−2, comes from the sum outputs of the partial products $X_{g-3, b-1}$, and the leftist bit $P_{2b-1}$ of the product comes from the carry output of the cell $C_{b-1,b-1}$.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
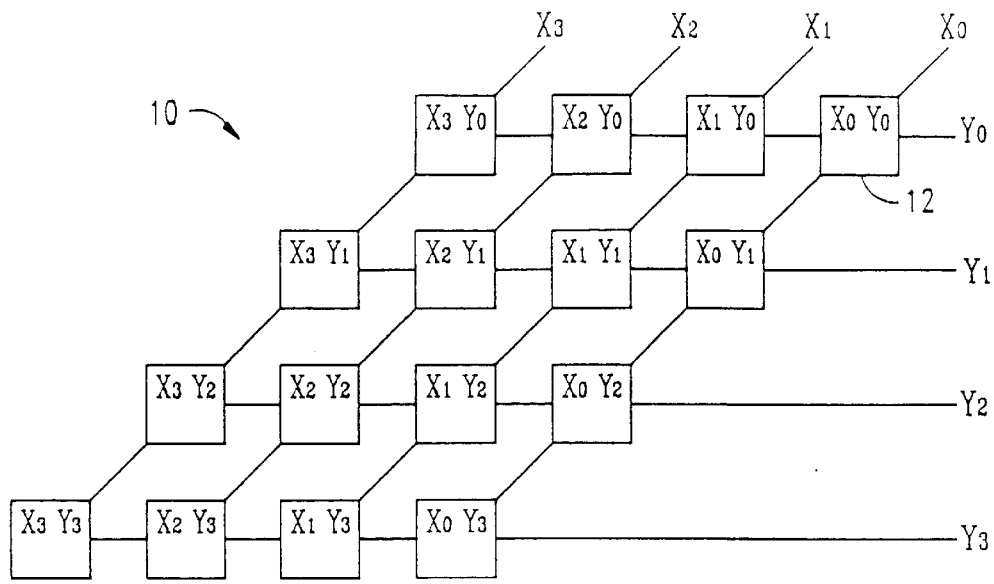
FIG. 1 shows a structure illustrating a conventional arrangement of the partial products constructed by a 4×4 array of standard AND gates.
Figure 2A:
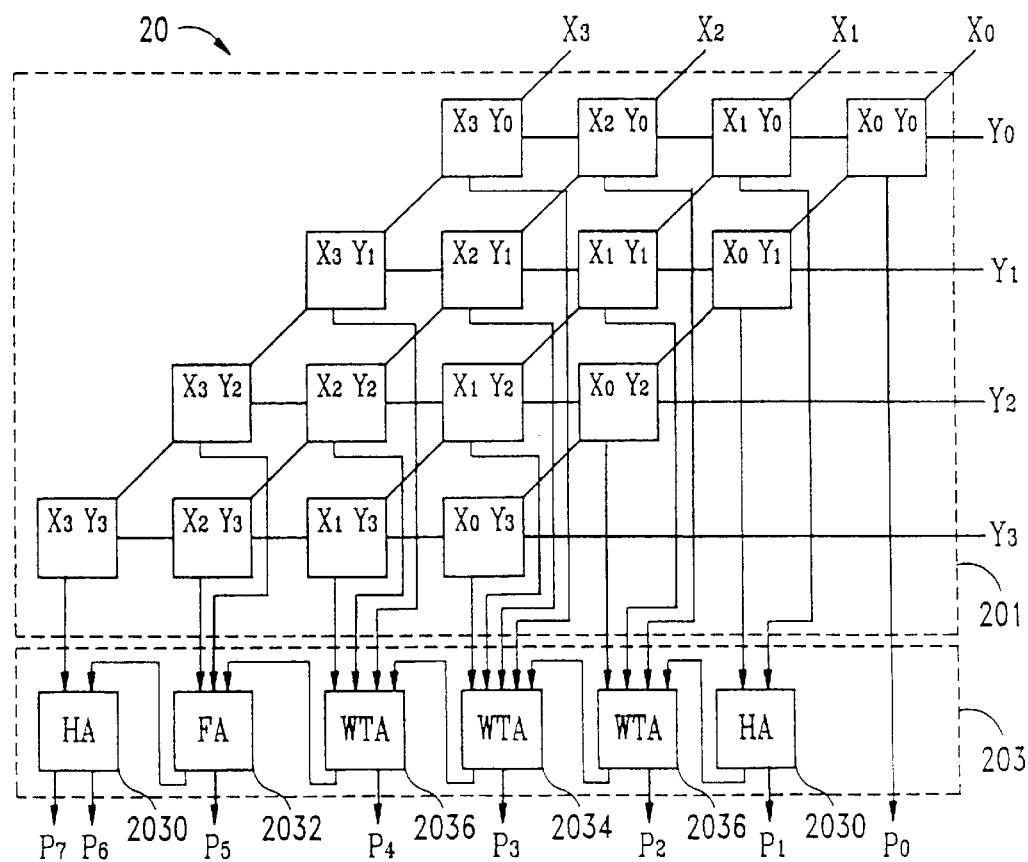
FIG. 2A shows a conventional structure illustrating a 4×4 array multiplier consisted of a 4×4 partial product array and an array of adders.
Figure 2B:
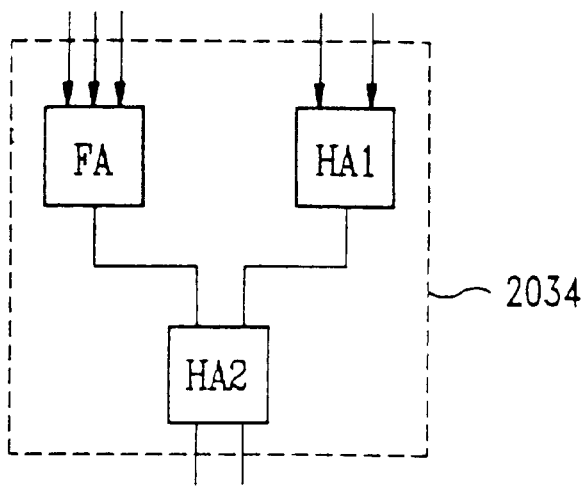
FIG. 2B shows one implementation of the Wallace Tree adder.
Figure 2C:
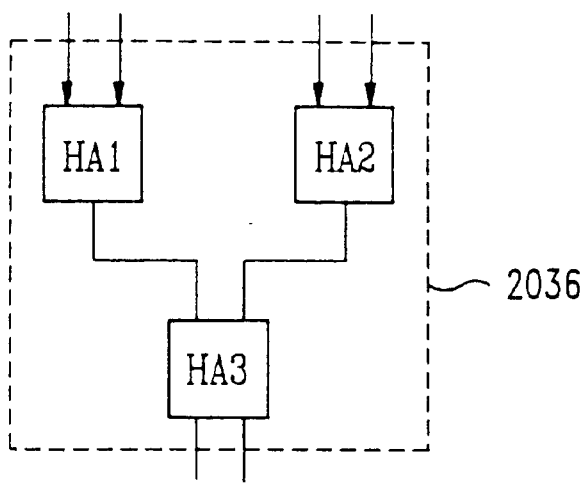
FIG. 2C shows two layers of half adders HA1, HA2, and HA3 arranged to form the Wallace Tree adder.
Figure 3:
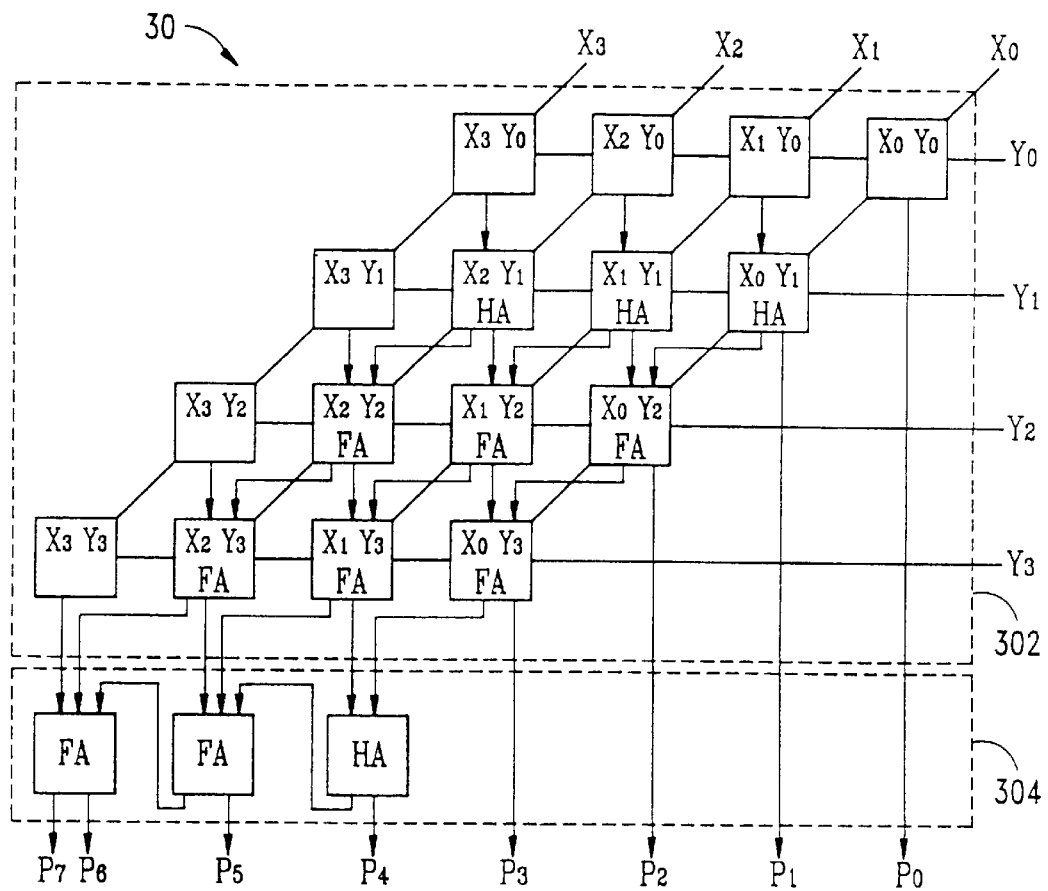
FIG. 3 shows another conventional multiplier with carry-saved adder.
Figure 4:
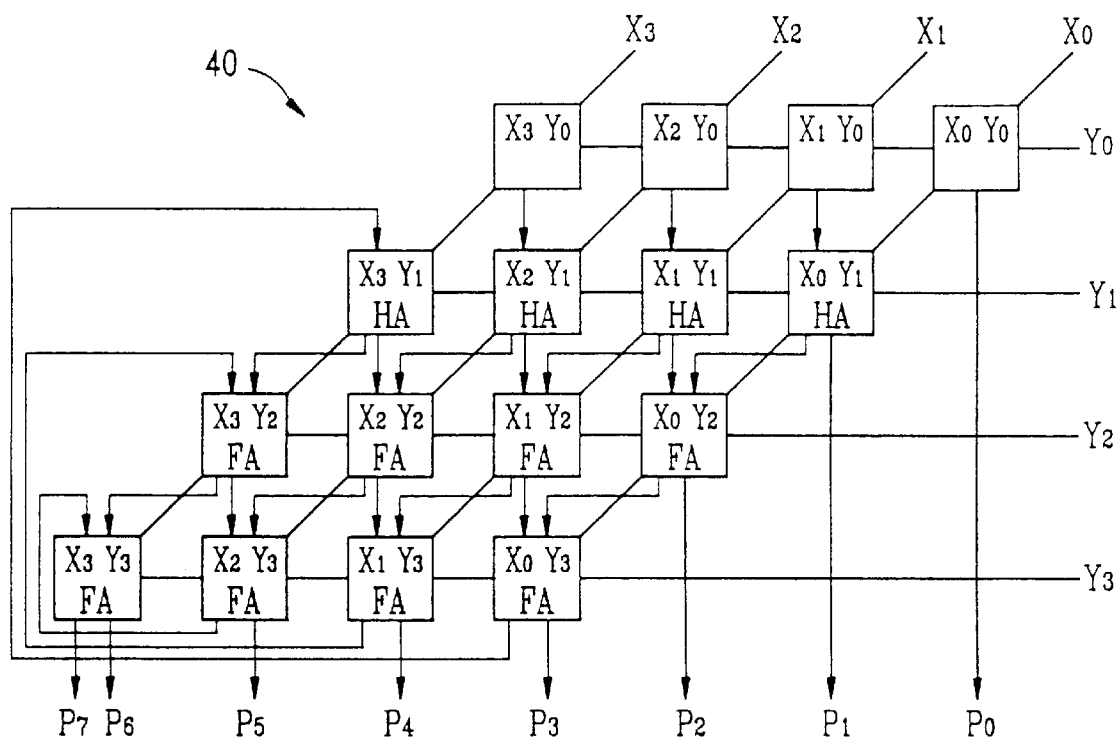
FIG. 4 shows a 4×4 array multiplier in accordance with one embodiment of the present invention.

FIG. 4 shows a 4×4 array multiplier 40 in accordance with one embodiment of the present invention. This array multiplier 40 includes 4×4 cells arranged in a two-dimensional configuration to calculate the total of one number X multiplied by another Y. The partial products calculated in the multiplication process are independently generated in parallel by the corresponding AND gate in each cell. In this embodiment, let $X=X_3X_2X_1X_0$ and $Y=Y_3Y_2Y_1Y_0$ be 4-bit binary integers representing multiplicand and multiplier, respectively, and $P=P_7P_6...P_1P_0$ be 8-bit product. Each bit of the multiplier Y is timed to the multiplicand X to produce a corresponding partial product. In the second row of the array multiplier 40, except for the cell far to the left, half adders HAs are used to calculate the sums of the partial products of the second row and the first row. Beginning from the third row of the array multiplier 40, except for the cell far to the left, full adders FAs are used to calculate the sums of the partial products of the current row, the partial products of the precedent row, and the carry from the precedent row, whose connections are shown by the arrows. Compared to the array multiplier 30 of FIG. 3, in the present invention, there are no extra adders required to calculate the sum of the carry and sum of the last row of the array multiplier 40. On the contrary, carriers are rolled over to the array cells of its left column, thereby resulting in a two-dimensional array configuration with great regularity. Therefore, the layout becomes simplified because the circuits of the array cells in each row are the same. Moreover, the area of the array multiplier 40 can be economically utilized due to the regularity of its layout structure.

It is appreciated for those skilled in the art that the embodiment illustrated in FIG. 4 may be generalized to a general b×b array multiplier for performing multiplication of a b-bit multiplicand $X=X_{b-1}X_{b-2}...X_1X_0$ and a multiplier $Y=Y_{b-1}Y_{b-2}...Y_1Y_0$. It is further appreciated that the multiplication is not limited to binary numbers, that is, other number system having radix other than two may also be processed by tile disclosed array multiplier. Therefore, the term "bit" used in this specification and the claims is generally referred to a digit of a number. Generally, a cell $C_{mn}$ in the array multiplier according to the present invention calculates a partial product $X_m Y_n$ by, for example, a standard AND gate, where m=0, 1, 2, ..., b−1, and n=0, 1, 2, ..., b−1. The cell $C_{mn}$ receives the first input operand from the output of its corresponding AND gate, and receives the second input operand from a sum output of a cell $C_{m+1,n-1}$, where m=0, 1, 2, ..., b−2, and n=1, 2, ..., b−1. Particularly for the cell $C_{b-1,n}$ (where n=1, 2, ..., b−1), its second input operand comes from a carry output of cell $C_{n-1,b-1}$. The third input operand of the cell $C_{mn}$ (where m=0, 1, 2, ..., b−1, and n=2, 3, ..., b−1) comes from the carry output of the cell $C_{m,n-1}$. The product output $P=P_{b-1}P_{b-2}...P_2P_1P_0$ of the array multiplier is ready at the sum outputs of the array multiplier. More specifically, the right portion of the product $P_f$ (i.e., $P_{[0,(b-1)]}$) is derived directly from the sum output of the cell $C_{0,f}$, and a portion of the product $P_g$ (i.e., $P_{[b,2b-2]}$) is derived directly from the sum output of the cell $C_{g-3,b-1}$, and the leftist bit $P_{2b-1}$ of the product is derived from the carry output of the cell $C_{b-1,b-1}$.

Although specific embodiments have been illustrated and described, it will be obvious to those skilled in the art that various modifications may be made without departing from the spirit which is intended to be limited solely by the appended claims.

What is claimed is:

1. An array multiplier for performing multiplication of a multiplicand X and a multiplier Y to generate a product P, wherein said multiplicand X is a b-bit number ($X=X_{b-1} X_{b-2} ... X_1X_0$), said multiplier Y is a b-bit number ($Y=Y_{b-1}Y_{b-2} ... Y_1Y_0$), and said product P is a 2b-bit number ($P=P_{2b-1}P_{2b-2} ... P_1P_0$), said array multiplier comprising:

a plurality of cells $C_{mn}$ configured in a b×b array, where m=0, 1, 2, ..., b−1, and n=0, 1, 2, ..., b−1;

a plurality of pieces of means for generating partial product $X_{mn}$, each piece of said partial product generating means being correspondingly associated with one of said plurality of cells $C_{mn}$ so that outputs of said pieces of partial product generating means are connected to first inputs of said cells respectively;

means for connecting second inputs of the cells $C_{mn}$, where m=0, 1, 2, ..., b−2, and n=1, 2, ..., b−1, to first outputs of the cells $C_{m+1, n-1}$ respectively;

means for connecting second inputs of the cells $C_{b-1, n}$, where n=1, 2, ..., b−1, to second outputs of the cells $C_{n-1, b-1}$ respectively; and means for connecting third inputs of the cells $C_{mn}$, where m=0, 1, 2, ..., b−1, and n=2, 3, ..., b−1, to the second outputs of the cells $C_{m, n-1}$;

wherein a portion of the product $P_f$, where f=0, 1, ..., b−1, comes from the first outputs of the cells $C_{0,f}$, another portion of the product $P_g$, where g=b, b+1, ..., 2b−2, comes from the first outputs of the cells $C_{g-3, b-1}$, and a most significant bit $P_{2b-1}$ of the product comes from the second output of the cell $C_{b-1,b-1}$.

2. The array multiplier according to claim 1, wherein each of said cells $C_{m1}$, where m=0, 1, ..., b−1, comprises a half adder.

3. The array multiplier according to claim 2, wherein each of said cells $C_{mn}$, where m=0, 1, ..., b−1, and n=1, 2, ..., b−2, comprises a full adder.

4. The array multiplier according to claim 3, wherein said first outputs of the cells are sum outputs.

5. The array multiplier according to claim 4, wherein said second outputs of the cells are carry outputs.

6. The array multiplier according to claim 1, wherein said piece of partial product generating means comprises an AND gate, said AND gate having a first input terminal configured to receive one bit of said multiplicand, and having a second input terminal configured to receive one bit of said multiplier.

7. An array multiplier for performing multiplication of a multiplicand X and a multiplier Y to generate a product P, wherein said multiplicand X is a b-bit number (X=$X_{b-1}$ $X_{b-2}$ ... $X_1X_0$), said multiplier Y is a b-bit number (Y=$Y_{b-1}$ $Y_{b-2}$ ... $Y_1Y_0$), and said product P is a 2b-bit number (P=$P_{2b-1}P_{2b-2}$ ... $P_1P_0$), said array multiplier comprising:

a plurality of cells $C_{mn}$ configured in a b×b array, where m=0, 1, 2, ..., b−1, and n=0, 1, 2, ..., b−1;

a plurality of AND gates for generating partial product $X_{mn}$, each piece of said AND gates being correspondingly associated with one of said plurality of cells $C_{mn}$ so that outputs of said AND gates air connected to first inputs of said cells respectively;

a plurality of half adders being associated with the cells $C_{m1}$ respectively, where m=0, 1, ..., b−1;

a plurality of full adders being associated with the cells $C_{mn}$ respectively, where m=0, 1, ..., b−1, and n=1, 2, ..., b−2;

wherein second inputs of the cells $C_{mn}$, where m=0, 1, 2, ..., b−2, and n=1, 2, ..., b−1, are connected to sum outputs of the cells $C_{m+1,n-1}$ respectively, second inputs of the cells $C_{b-1, n}$, where n=1, 2, ..., b−1, are connected to carry outputs of the cells $C_{n-1, b-1}$ respectively, third inputs of the cells $C_{mn}$, where m=0, 1, 2, ..., b−1, and n=2, 3, ..., b−1, are connected to the carry outputs of the cells $C_{m, n-1}$, and wherein a portion of the product $P_f$, where f=0, 1, ..., b−1, comes from the sum outputs of the cells $C_{0, f}$, another portion of the product $P_g$, where g=b, b+1, ..., 2b−2, comes from the sum outputs of the cells $C_{g-3, b-1}$, and a most significant bit $P_{2b-1}$ of the product comes from the carry output of the cell $C_{b-1,b-1}$.

8. A method for performing multiplication of a multiplicand X and a multiplier Y to generate a product P, wherein said multiplicand X is a b-bit number (X=$X_{b-1}X_{b-2}$ ... $X_1X_0$), said multiplier Y is a b-bit number (Y=$Y_{b-1}$ $Y_{b-2}$ ... $Y_1Y_0$), and said product P is a 2b-bit number (P=$P_{2b-1}$ $P_{2b-2}$ ... $P_1P_0$), said method comprising:

generating a plurality of partial products $X_{mn}$, where m=0, 1, 2, ..., b−1, and n=0, 1, 2, ..., b−1;

firstly adding the partial products $X_{m+1, n-1}$ to the partial products $X_{mn}$, where m=0, 1, 2, ..., b−2, and n=1, 2, ..., b−1, wherein said first addition respectively generates a carry output for each of said partial products;

secondly adding carry outputs of the partial products $X_{n-1, b-1}$ to the partial products $X_{b-1, n}$, where n=1, 2, ..., b−1, wherein said second addition respectively generates the carry output for the partial products;

thirdly adding the carry outputs of the partial products $X_{m, n-1}$ to the partial products $X_{mn}$, where m=0, 1, 2, ..., b−1, and n=2, 3, ..., b−1;

wherein a portion of the product $P_f$, where f=0, 1, ..., b−1, comes from the sum outputs of the partial products $X_{0, f}$, another portion of the product $P_g$, where g=b, b+1, ..., 2b−2, comes from the sum outputs of the partial products $X_{g-3, b-1}$, and a most significant bit $P_{2b-1}$ of the product comes from the carry output of the cell $C_{b-1,b-1}$.

9. The method according to claim 8, wherein said plurality of partial products are generated by logically ANDing one bit of said multiplicand and one bit of said multiplier.

* * * * *